United States Patent Office 3,814,671
Patented June 4, 1974

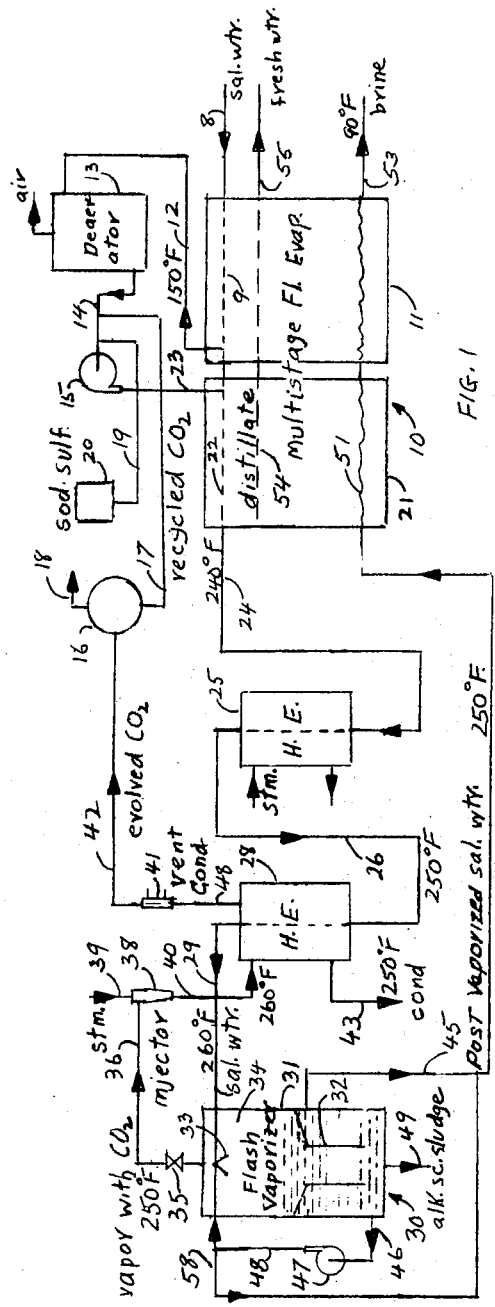
FIG. 1
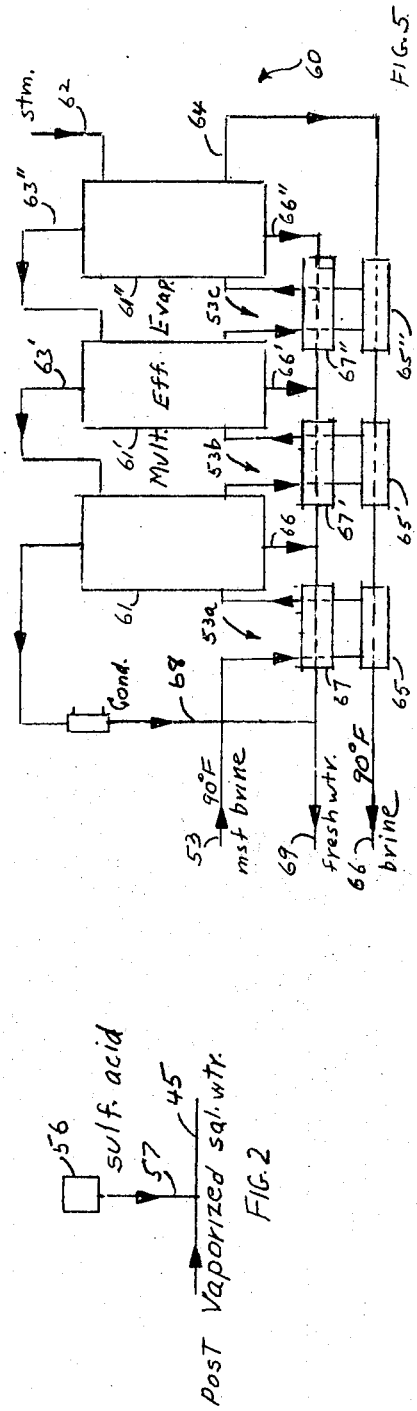
FIG. 5
FIG. 2

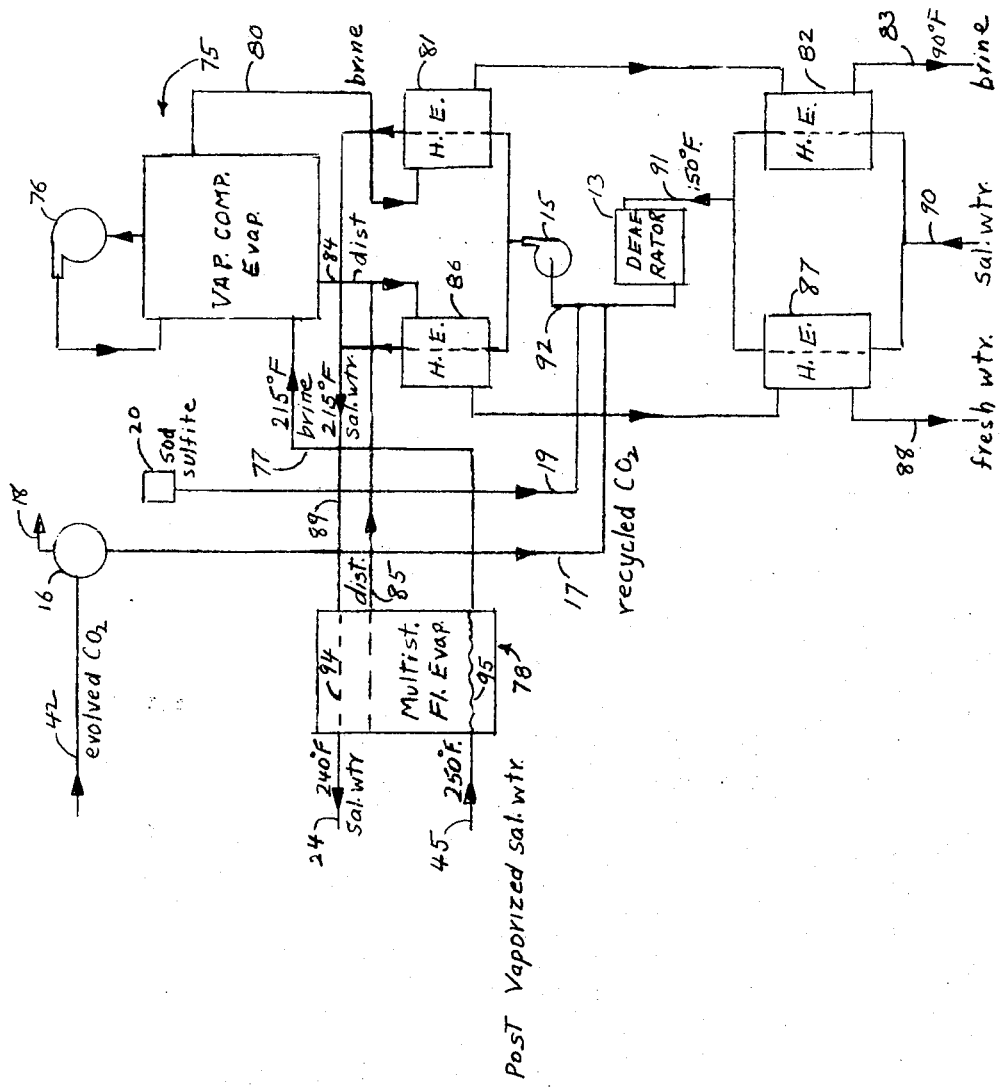

---

3,814,671
METHOD AND APPARATUS FOR SALINE WATER CONVERSION
Paul S. Roller, 825 Colorado Bldg., 1341 G St. NW.,
Washington, D.C. 20005
Filed Apr. 20, 1972, Ser. No. 245,732
Int. Cl. B01d 3/06
U.S. Cl. 203—7    14 Claims

ABSTRACT OF THE DISCLOSURE

Saline water containing scale-forming alkaline bicarbonate is indirectly heated while avoiding alkaline scale, due to the presence of recycled $CO_2$. The heated saline water is flash vaporized and alkaline bicarbonate thermally decomposed, forming $CO_2$, a precipitate of alkaline scale compound and flashed saline water. The flashed vapor with included $CO_2$ is condensed and $CO_2$ released from hot condensate as evolved $CO_2$; the latter is recycled to the saline water, while discharging excess evolved $CO_2$. Precipitate of alkaline scale compound is separated from flashed saline water and employed as nucleant for precipitate formed in flash vaporization, whereby the thermal decomposition is accelerated. The flash vaporization may be conducted in stages, a slight residual of alkaline bicarbonate in the flashed saline water being thereby reduced to an indefinitely small value. The flashed saline water is evaporated in a multi-stage flash evaporator; or this combined with a surface heat evaporator forming concentrated brine and fresh water at high yield.

---

The invention relates to the conversion of saline water to fresh water and brine by evaporation, with particular reference to the prevention of alkaline scale during prior heating of the saline water and in evaporation.

Saline water and specifically sea water are characterized by the presence in solution of alkaline scale-forming calcium and magnesium bicarbonates and carbonates. The carbonate content being negligible, the compounds may be referred to, in short, as alkaline bicarbonate.

Alkaline bicarbonate may be thermally decomposed to form $CO_2$ and the alkaline scale compounds, $CaCO_3$ and/or $Mg(OH)_2$, according to the following equations:

(1) 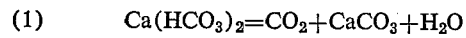$\quad Ca(HCO_3)_2 = CO_2 + CaCO_3 + H_2O$ (2) 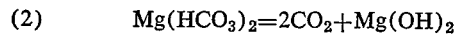$\quad Mg(HCO_3)_2 = 2CO_2 + Mg(OH)_2$ The extent of the thermal decomposition depends, as the equations indicate, significantly upon the partial pressure of the evolved $CO_2$, as well as temperature. Since evolved $CO_2$ is cardinal to the process of this invention, it is pertinent to note that two mols of $CO_2$ are liberated per mol of $Mg(OH)_2$, as against one per mol of $CaCO_3$. The formation of $Mg(OH)_2$ is, therefore, to be favored for the higher evolving of $CO_2$; also for its superior capability as a nucleant for precipitate of alkaline scale compound, as subsequently provided for.

A process based on the utilization of evolved $CO_2$ for preventing alkaline scale in heating saline water prior to evaporation has been disclosed in applicant's U.S. Pat. 3,607,666. As indicated therein, a source of evolved $CO_2$ is the thermal decomposition of alkaline bicarbonate in saline water. While some thermal decomposition is readily obtainable, full and rapid decomposition is necessary for maximum economic feasibility of a process employing evolved $CO_2$ for alkaline scale prevention.

It is, accordingly, an object of the invention to provide for extensive thermal decomposition of alkaline bicarbonate and an accompanying high formation of evolved $CO_2$.

Another object is to provide for nucleation of a precipitate of alkaline scale compound formed in thermal decomposition, and resultant acceleration of the decomposition.

A further object is to provide for the utilization as nucleant of precipitate of alkaline scale compound formed in thermal decomposition.

Still another object is to provide for a negligible residual of alkaline bicarbonate in the saline water following thermal decomposition.

A still further object is to provide for thermal decomposition at a higher temperature than that of subsequent evaporation and thereby to effect the precipitation of minor, non-alkaline scale-forming compounds prior to evaporation.

Figure 3:
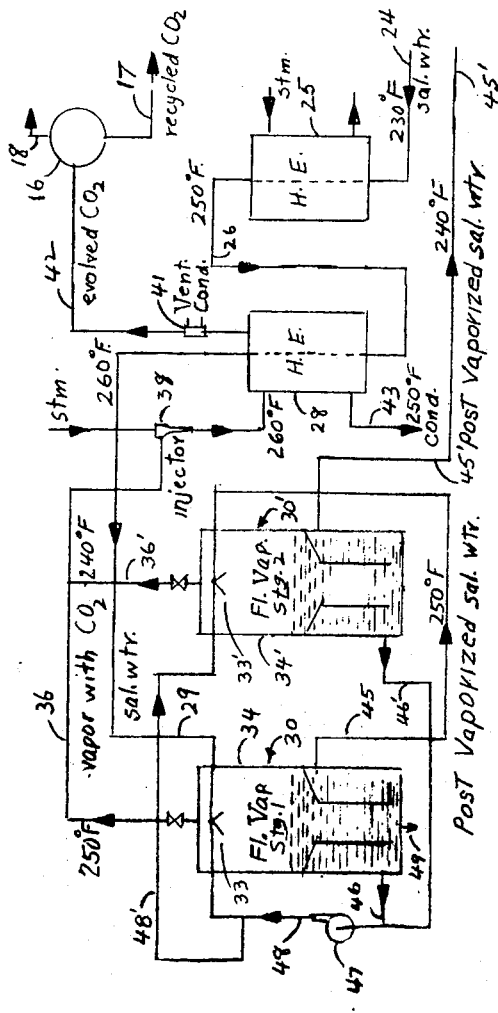
Figure 4:
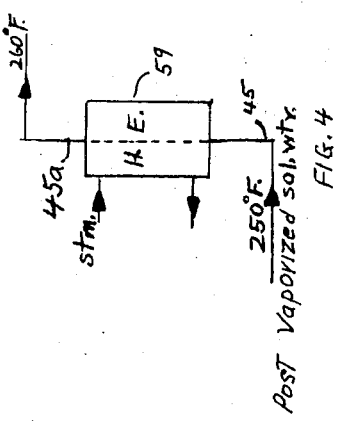

With these and other objects in mind, as will become more apparent from the description which follows, for a better understanding of the invention, reference is made to the drawing, in which similar parts are similarly numbered, and in which FIG. 1 is a diagrammatic representation of an apparatus according to the invention, FIG. 2 is a fragmentary diagram illustrating the addition of acid with reference to a residual of alkaline bicarbonate, FIG. 3 is a diagram illustrating an alternate mode of thermal decomposition, FIG. 4 is a fragmentary diagram of a reheat heat exchanger as employed in the mode of FIG. 3, FIG. 5 is a diagrammatic illustration of a surface heat evaporator employed according to the invention, and FIG. 6 is a diagrammatic illustration of an alternate surface heat evaporator employed according to the invention.

In the drawing connecting lines represent conduits, and the arrowheads thereon the direction of fluid flow. Temperatures inscribed on the lines refer particularly to temperatures of sea water; while relatively correct, they are individually variable within limits. For clarity of presentation, temperature differentials in heat exchange have been omitted from consideration.

Referring now to FIG. 1, saline water from line 8 passes into heating tubes 9 of multistage flash evaporator 10. The saline water may, at about 150° F., after section 11 leave the evaporator and pass through line 12 to deaerator 13, from which it issues into line 14 connected to the intake of pump 15.

Evolved $CO_2$ in container 16 is recycled through line 17 to the saline water in line 14, while an excess of evolved $CO_2$ is dicharged through line 18. The presence of recycled $CO_2$ in the saline water prevents the formation of alkaline scale on heat transfer surfaces in indirectly heating the saline water prior to evaporation.

A deoxygenating agent, selected from a group listed in U.S. 3,607,666 and normally sodium sulfite, is transferred to the deaerated saline water in line 14 from line 19 connected to sodium sulfite container 20.

Upon deaeration of the saline water, an air residual remains, which in thermal decomposition is carried into the evolved $CO_2$ and recycled with it to the saline water. As demonstrated in applicant's U.S. Pat. 3,607,666, despite the recycle, air residual does not accumulate in the saline water; rather it reaches and remains at a steady level. The steady level may be succinctly understood on the basis that it represents a balance between air residual brought in by deaerated saline water and that escaping with excess evolved $CO_2$.

If deaeration is omitted, a steady level of air in the saline water still maintains, although obviously greater than in the case of deaeration.

From pump 15 and line 23, the deaerated saline water returns at section 21 to multistage flash vaporator 10. Flowing through heating tubes 22 therein, its temperature is increased to 240° F., at which it exits from the evaporator in line 24. Entering now steam-heated heat exchanger 25, the saline water issues at 250° F. into line 26.

The description which next follows relates particularly to that part of the apparatus involving thermal decomposition of alkaline bicarbonate in the saline water.

From line 26, the saline water passes through condensing heat exchanger 28, in which it is indirectly heated to its maximum temperature of 260° F.

Issuing into line 29, the saline water at this temperature enters therefrom flash vaporizer 30. The latter is constituted principally by chamber 31 furnished in its lower part with open-ended, central compartment 32. The heated saline water is flash vaporized in chamber 31, preferably after being dispersed by sprayer 33 communicating with line 29. Sprayer 33, comprising a nozzle, perforated duct or splash plate, is situated at the upper end of the chamber above vapor space 34, which receives the spray of flash vaporizing saline water.

Included in the flashed vapor is evolved $CO_2$, comprising that which had been recycled and that liberated in the thermal decomposition of alkaline bicarbonate. The flashdown, illustratively 10° F. from 260° F. to 250° F., provides vapor sufficient to result in a low partial pressure of the $CO_2$. Corresponding to the low partial pressure and high temperature, thermal decomposition is extensive and only a slight residual of alkaline bicarbonate remains in the flashed saline water.

In view of the aim of least partial pressure, condensation of vapor in chamber 31 is avoided. The entire flashed vapor with included $CO_2$ is expelled at the flashdown temperature of 250° F. through pressure control valve 35 into line 36. This line communicates with condensing heat exchanger 28, preferably through interposed steam injector 38, in which the vapor with included $CO_2$ is combined with steam at a higher temperature entering said injector from line 39. The resultant vapor at 260° F. passes from line 40 to condensing heat exchanger 28, and condenses therein while in indirect contact with saline water being heated from 260° F. to 250° F. $CO_2$ that had been included in the flashed vapor is released upon hot condensation of resultant vapor, and as evolved $CO_2$ passes out of condensing heat exchanger 28 through vent condenser 41 to line 42 and $CO_2$ container 16, while condensate at 250° F. and free of $CO_2$ is discharged through line 43.

Alternatively, omitting steam injector 38, vapor with included $CO_2$ issuing from flash vaporizer 30 condenses in condensing heat exchanger 28 at 250° F. while heating saline water from 240° F. to 250° F. Steam-heated heat exchanger 25, instead of preceding said condensing heat exchanger, is employed subsequent to it; the saline water at 250° F. is heated in said steam-heated heat exchanger to 260° F., at which it passes to flash vaporizer 30 as before. The alternate employment of steam injector 38 is preferred, since among other advantages it provides for vapor condensate being at 260° F. instead of 250° F., a circumstance favorable for the release of $CO_2$ from the condensate.

In chamber 31, beneath vapor space 34 a column of flashed saline water containing suspended precipitate of alkaline scale compound reaches above compartment 32. Descending in said compartment, the saline water reverses its flow at the lower end thereof, upon which the precipitate may deposit as alkaline scale sludge at the bottom of chamber 31. Clarified, or as intended containing a quota of precipitate in suspension, the flashed saline water flows upward in the annulus between compartment 32 and chamber 31, issuing at 250° F. in line 45 as post-vaporized saline water to evaporation.

To accelerate the thermal decomposition in flash chamber 31, a nucleant for the precipitate of alkaline scale compound may be included in the flash vaporizing saline water. The nucleant shall comprise a finely divided material that is adsorptive or crystallographically compatible with the precipitate; for example, forms or compounds of alumina, ferric hydrate, calcium carbonate, magnesium hydroxide.

An opportune nucleant is the precipitate of alkaline scale compound, chiefly magnesium hydroxide under the expressed conditions of temperature and partial pressure, separated from the flashed saline water and comprised in the alkaline scale sludge in chamber 31. Sludge as nucleant is passed from chamber 31 into line 46 to recirculating pump 47, which delivers it through line 48 to the heated saline water at or preceding disperser 33; it is thence returned to the place of origin by the flashed saline water. That so recirculated and fresh precipitate of alkaline scale compound accumulates as sludge in the bottom of chamber 31, excess being discharged through line 49, while that retained is held to a desired level above or beneath the lower edge of compartment 32.

Alternate to its formation by thermal decomposition in flash vaporizer 30, precipitate of alkaline scale compound may be prepared extrinsically by the addition of an alkali to a solution of salts of magnesium and/or calcium. Although the extrinsic precipitate may be employed exclusively, generally, insofar as it is employed at all, it will supplement that formed in process thermal; also, it may serve to initiate nucleation, and as a temporary replacement of alkaline scale sludge to compensate for occasional deterioration of the sludge; due, for example, to excessively large grain growth in recirculation. Alternately in the latter case, alkaline scale sludge discharged in line 49 may be classified as to size, the fine fraction recovered, and, by way of recirculating pump 47, passed as nucleant to the flash vaporizing saline water.

The post-vaporized saline water to be evaporated passes preferably in the first place to a multistage flash evaporator. According to the mode of FIG. 1, multistage flash evaporator 10 is employed exclusively. Flowing through channel 51 thereof while flash evaporating, the saline water exits in line 53 as brine at 90° F. Distillate that is concurrently formed flows at decreasing temperature through channel 54, exiting in line 55 as fresh water.

It is characteristic of multistage flash evaporation exclusively employed that the concentration factor of the brine at 90° F. with respect to the original saline water is low; and likewise the yield of fresh water, which is less than 20% of the maximum obtainable, in the instance of sea water. On the other hand, in the case of surface heat evaporation, where, as in multiple effect or vapor compression evaporation, heat is externally applied to the evaporating saline water, the concentration factor of the brine at 90° F. is high; and likewise the yield of fresh water, which can be greater than 60% in the instance of sea water.

Accordingly, the invention provides for conducting evaporation in a surface heat evaporator. While this may be applied directly to the post-vaporize saline water at 250° F. in line 45, it is preferred that the temperature be first reduced, preferably in a multistage flash evaporator, wherefrom the brine at decreased temperature is passed to a surface heat evaporator for final evaporation.

The slight residual of alkaline bicarbonate in the post-vaporized saline water must be particularly considered in regard to the evaporation. The slight residual will be of no consequence in the case of multistage flash evaporation for two principal reasons: in the first place, the temperatures of multistage flash evaporation are all lower than that of preceding flash vaporization, and the residual will tend, therefore, to remain undecomposed; in the second place, should decomposition take place, the resulting slight precipitate of alkaline scale compound forms out of contact with a heat exchange surface and so is simply suspended in the flash evaporating saline water.

In the case of a surface heat evaporator, however, the possibility has to be taken into account that, despite comparatively low temperatures, alkaline scale may form on the evaporator heat exchange surfaces. The invention provides, therefore, either for the elimination of the slight residual, its counteraction, or its reduction in processing to a negligibly low value.

An indefinitely small value of the residual may be achieved in processing by flash vaporizing the heated saline water in stages, as subsequently described. Elimination or counteraction may be effected by expedients: in regard to the former, by acid addition to decompose the residual; and in regard to the latter, by nucleation to cause suspension in evaporation of a resultant slight precipitate. In eliminating a residual of alkaline bicarbonate, as shown in FIG. 2, acid, more particularly sulfuric acid, is passed in equivalent quantity from container 56 and line 57 to the post-vaporized saline water in line 45. The slight $CO_2$ that is formed will, in subsequent multistage flash evaporation, tend to be vented in the flash chambers and so excluded from a following surface heat evaporator.

In counteracting a residual of alkaline bicarbonate, a quota of alkaline scale sludge employed as nucleant can be allowed to carry over, as indicated hereinabove, into the post-vaporized saline water passing out of chamber 31. Supplementing the carry-over, or in lieu thereof, alkaline scale sludge may, with comparatively greater precision, be transferred from chamber 31 through recirculating pump 47 and line 58 to the post-vaporized saline water in line 45.

In applying flash vaporization in stages to reduce the residual of alkaline bicarbonate to a negligible value, each of similar stages receives the post-vaporized saline water of a preceding stage; the flashed vapors with included $CO_2$ of each stage are combined to form hot condensate, from which $CO_2$ is released as evolved $CO_2$; and post-vaporized saline water of the last stage passes to evaporation.

At a sufficiently high temperature of the heated saline water, two stages are often sufficient to obtain a reduced residual that is acceptable for surface heat evaporation. In FIG. 3 is shown a multistage flash vaporizer comprising two stages, which are typical and illustrative of a larger number. Heated saline water enters first stage flash vaporizer 30 at 260° F. from condensing heat exchanger 28 and line 29. After a flashdown of 10° F., the post-vaporized saline water issues at 250° F. into line 45 to second stage flash vaporizer 30'. After a second flashdown of 10° F., the again post-vaporized saline water issues from the second and last stage at 240° F. into line 45', from which it passes to evaporation.

The steps leading to the first stage entry of saline water at 260° F. are similar to those already recited: namely, heating saline water to 230° F. in a multistage flash evaporator, to 250° F. in steam-heated heat exchanger 25 and finally to 260° F. in condensing heat exchanger 28.

Considering the progress of the vapor in multistage flash vaporization, illustratively in FIG. 3 vapor with included $CO_2$ in line 36 from first stage flash vaporizer 30 is combined with the vapor with included $CO_2$ from line 36' and second stage flash vaporizer 30'. The combined vapors with included $CO_2$ pass from line 36 to steam injector 38. Issuing therefrom combined with steam, the resultant vapor passes to condensing heat exchanger 28, in which $CO_2$ is released from hot condensate into line 42 as evolved $CO_2$, while condensate free of $CO_2$ is discharged at 250° F. from line 43.

$CO_2$ formed in the second stage is derived from the slight residual of alkaline bicarbonate and is similarly slight. The vapor formed, being, however, practically equal, the partial pressure of $CO_2$ in the second stage is much less than in the first. The 10° F. lower temperature of the second stage is of comparatively little consequence. Hence, residual alkaline bicarbonate is further and extensively decomposed in the second stage. Decreasing partial pressure and further thermal decomposition similarly occurs sequentially in stages after the second.

Alkaline scale sludge formed in the second stage is, like evolved $CO_2$ therefrom, comparatively slight. The sludge may be combined with that of the first stage through line 46' connected to line 46 and recirculating pump 47.

In order to accelerate second stage thermal decomposition, alkaline scale sludge may through line 48' be recirculated to the post-vaporized saline water entering that stage, the transfer being similar to that for the first stage through line 48. Carry-over of alkaline scale sludge in the post-vaporized saline water passing through line 45 to the second stage may, if it occurs, supplement or displace transfer by recirculation.

The decrease in temperature due to flashdown may, particularly after the second stage, despite nucleation, affect too adversely the rate of thermal decomposition. In order to counteract the reduction in rate, a high temperature of the post-vaporized saline water entering each stage may be maintained by reheating it between sequential stages. Illustratively, in FIG. 4 the post-vaporized saline water from first stage flash vaporizer 30 flows at 250° F. from line 45 into steam-heated reheat heat exchanger 59. Issuing therefrom into line 45a, it enters second stage flash vaporizer 30' at the same temperature of 260° F. as on entering the first stage; similarly for all stages having a bilaterally interposed reheat heat exchanger 59.

Alkaline scale is averted in the reheat heat exchanger for the following several reasons: there is little inherent tendency, since originative alkaline bicarbonate is only residual; temperatures are no greater than in the preceding flash vaporizer; the flashed saline water is saturated with scale-preventing $CO_2$; further vaporization is precluded in the reheat heat exchanger; finally, scale sludge which may carry over is a nucleant preventive of surface scale.

In applying to the brine of a multistage flash evaporator a following surface heat evaporator, it will be understood that a residual of alkaline bicarbonate will relatedly have been eliminated, counteracted, or reduced to a negligible value by multistage flash vaporization.

Illustrative of one form of surface heat evaporator and its combination with a multistage flash evaporator, multiple effect evaporator 60, having as shown in FIG. 5 representationally three effects, 61, 61' and 61", receives brine at 90° F. from connecting line 53 terminal to multistage flash evaporator 10. Passing through each effect in succession, the brine is progressively evaporated by the inter-effect vapors in lines 63' and 63" and steam in line 62. From line 64, in which it is at its maximum temperature, the brine passes through a sequence of cooling heat exchangers, 65", 65' and 65, exiting in line 66 as brine at the initial temperature of 90° F., but much more concentrated than at exit from multistage flash evaporator 10. Concurrently, distillate issuing from each effect in lines 66, 66' and 66" passes cumulatively through a sequence of cooling heat exchangers, 67", 67' and 67, and, combined with condensate in line 68, exits in line 69 as fresh water at relatively high yield. Coolant for said sequences of cooling heat exchangers is brine communicating with each from inter-effect, heat-absorbing loops 53a, 53b and 53c.

Illustrative of an alternate form of surface heat evaporator and its combination with a multistage flash evaporator, vapor compression evaporator 75, equipped as shown in FIG. 6 with vapor compressor 76, receives brine at 215° F. from line 77 terminal to multistage flash evaporator 78. Evaporated by the heat of condensation of compressed vapor, hot brine issues from evaporator 75 in line 80; and, passing in sequence through cooling heat exchangers 81 and 82, exits in line 83 as brine at 90° F. concentrated as in the case of multiple effect evaporator 60. Concurrently, distillate from vapor compression evaporator 75 in line 84, after being united therein with distillate issuing at 215° F. in line 85 terminal to multistage flash evaporator 78, passes in sequence through cooling heat exchangers 86 and 87, exiting in line 88 as fresh water at high yield.

Coolant for said cooling heat exchangers is the saline water that is to be converted to fresh water. From entrance line 90 it passes in split stream through cooling heat exchangers 82 and 87; and, recombined at about 150° F. in line 91, it flows into deaerator 13, issuing therefrom through line 92 to pump 15. While in line 92 it receives evolved $CO_2$ recycled from line 17, and sodium sulfite from line 19. Again in split stream, the saline water passes through cooling heat exchangers 81 and 86; and, recombined in line 89, it enters multistage flash evaporator 78 at 215° F.

Passing through heating tubes 94 of said evaporator, the saline water issues at 240° F. in line 24. Passing through flash vaporizer 30 and components as described, it returns at 250° F. through line 45 to multistage flash evaporator 78; and evaporating therein while flowing through channel 95, issues, as above said, in line 77 as brine at 215° F., with distillate in line 85 at 215° F.

The temperature of 215° F. for the brine entering vapor compression evaporator 75 is chosen for two principal reasons: first, vapor passed to compressor 76 is desirably above atmospheric pressure; second, in the instance of sea water, this temperature is approximately optimum for maximum concentration of the evaporating brine before anhydrite will have formed and oblige an end to the evaporation, whether vapor compression, or other surface heat evaporation to high brine concentration.

Flash vaporization and concurrent thermal decomposition will now be explicitly exemplified with respect to sea water. Containing 140 p.p.m. alkaline bicarbonate as $HCO_3^-$, it receives 70 p.p.m. of recycled evolved $CO_2$ for preventing alkaline scale in indirect heating to 260° F. In subsequent flash vaporization, the heated sea water is flashed down by 10° F. from 260° F. to 250° F. The partial pressure in the vapor is $1.2 \times 10^{-2}$ atm. and at the temperature of 250° F. thermal decomposition takes place to the extent of 87%, corresponding to a residual of 18 p.p.m. alkaline bicarbonate in the post-vaporized saline water. The precipitate of alkaline scale compound consists of $Mg(OH)_2$, any $CaCO_3$ present being metastable; the quantity is 58 p.p.m. out of a maximum of 67 p.p.m.

In a second stage flashdown of 10° F. from 250° F. to 240° F., the partial pressure of $CO_2$ is only $8 \times 10^{-4}$. At the temperature of 240° F., the overall decomposition is 98.5% and the residual of alkaline bicarbonate is reduced to 2.1 p.p.m. An additional 8 p.p.m. $Mg(OH)_2$ is precipitated, to a combined total of 66 p.p.m.

In the first stage 157 p.p.m. $CO_2$ is evolved, comprising 70 p.p.m. recycled and 87 p.p.m. liberated in the thermal decomposition. In the second stage 11 p.p.m. $CO_2$ is evolved, which combined with that of the first stage provides a total of 168 p.p.m. $CO_2$ out of a maximum of 170 p.p.m. Since 70 p.p.m. is recycled, 98 p.p.m., or much more than half the evolved $CO_2$, is in excess over that required for recycle.

A third stage flashdown of 10° F. from 240° F. would bring the temperature of thermal decomposition down to 230° F. In order at this point to protect against too low a rate of decomposition, the post-vaporized saline water may be reheated between stages. The initial temperature of each stage including that of a third is now 260° F. With this as a recurrent starting point, in a second stage flashdown of 10° F. the residual of alkaline bicarbonate is 1.6 p.p.m., as opposed to 2.1 p.p.m. in the absence of reheat. The indicated small increase in residual when the temperature is 250° F. instead of 260° F. is evidence of the minor effect of temperature in determining equilibrium in this range.

In a third stage flashdown of 10° F. from 260° F. to 250° F., the partial pressure of $CO_2$ is $8 \times 10^{-5}$ atm., and the residual of alkaline bicarbonate is reduced to 0.15 p.p.m., or 0.1% of the original in the sea water.

In the case of a lesser flashdown of 5° F. instead of 10° F., while the temperature of decomposition is favorably higher, less vapor is formed and the partial pressure of $CO_2$ is correspondingly increased. Counterbalancing the superior temperature, the higher partial pressure results in less thermal decomposition. At a 5° F. flashdown from 260° F., the partial pressure is $2.4 \times 10^{-2}$ atm., twice that for a 10° F. flashdown. Corresponding to a lesser thermal decomposition, the residual of alkaline bicarbonate is 28 p.p.m., as against 18 p.p.m. at a 10° F. flashdown from 260° F.

In a second stage flashdown of 5° F. from 255° F. to 250° F., the partial pressure is $2.3 \times 10^{-3}$ atm.; the residual is 4.2 p.p.m., to be compared with the denoted 2.1 p.p.m. at 10° F.

The invention has several noteworthy advantages. In the first place, it is free of the costs entailed in the conventional use of sulfuric acid for initially decomposing the entire alkaline bicarbonate in sea water. In the present process, the acid contingently employed to decompose a slight residual of alkaline bicarbonate is correspondingly slight; and, furthermore, requires no decarbonation; moreover, it may be avoided by the alternate of nucleation or of multistage flash vaporization.

Another advantage consists in the flash vaporization being unimpeded by interposed condensation, as in multistage flash evaporation; and in the substantial surplus of evolved $CO_2$.

A further advantage lies in the temperature of flash vaporization being higher than in following surface heat evaporation. The higher temperature, as well as an increase in pH because of the loss of $CO_2$, tends to provide for pre-precipitation of minor, non-alkaline scale-forming compounds of silica, iron, etc., which are thus prevented from forming scale in subsequent surface heat evaporation.

Having thus set forth the invention, it will be recognized that adaptations may be made that differ from those described and still fall within the spirit and scope of the invention as claimed.

What I claim is:

1. A process for converting saline water, characterized by the presence in solution of alkaline scale-forming compounds consisting chiefly of calcium and magnesium bicarbonates, to fresh water and brine, which comprises recycling to the saline water evolved carbon dioxide, as subsequently expressed, and heating saline water while preventing alkaline scale in heating due to the presence of the recycled carbon dioxide; passing the heated saline water at an elevated temperature to a flash vaporization chamber and flash vaporizing the saline water, forming flashed vapor sufficient to result in a low partial pressure of carbon dioxide in the chamber; through the elevated temperature and low partial pressure of carbon dioxide, thermally decomposing alkaline scale-forming compounds, forming a precipitate of alkaline scale compound while liberating carbon dioxide from the flashed saline water; passing flashed vapor with included, evolved carbon dioxide, comprising that which had been recycled and that liberated from the flash vaporization chamber, to a condenser; forming condensate in the condenser, releasing evolved carbon dioxide and recycling evolved carbon dioxide to the saline water out of an excess thereof, comprised in carbon dioxide which had been liberated; from the flashed saline water separating to the extent required precipitate of alkaline scale compound and forming post-vaporized saline water; and passing post-vaporized saline water to an evaporator, forming fresh water and brine.

2. Claim 1, wherein the flashed vapor with included, evolved carbon dioxide forms hot condensate while heating saline water.

3. Claim 2, wherein the flashed vapor with included, evolved carbon dioxide is combined with steam, and the vapor and steam heat saline water while forming combined, hot condensate.

4. Claim 1, wherein the flash vaporization chamber is multistaged, post-vaporized saline water passes from stage to stage and exists from the last stage to the evaporator, while the flashed vapors with included, evolved carbon dioxide from each of the stages are combined and passed to the condenser.

5. Claim 4, wherein post-vaporized saline water is heated between stages.

6. Claim 4, wherein the combined flashed vapors with included, evolved carbon dioxide are combined with steam, and vapors and steam pass to the condenser and heat saline water while forming, combined hot condensate.

7. Claim 1, wherein the evaporator comprises a multistage flash evaporator.

8. Claim 7, wherein the multistage flash evaporator is combined with a heat exchange evaporator, selected preferably from a vapor compression evaporator or a multiple effect evaporator, and the evaporated saline water of the multistage flash evaporator is passed to the heat exchange evaporator and further evaporated therein to form fresh water and brine.

9. The subject matter of claim 8 wherein a residual of alkaline scale-forming compound in post-vaporized saline water is decomposed by acid added thereto.

10. The subject matter of claim 8 wherein precipitate of alkaline scale compound is passed from the flash vaporization chamber to post-vaporized saline water, whereby a residue of alkaline scale-forming compound therein is subject to nucleation, and a corresponding precipitate of alkaline scale compound is suspended in the heat exchange evaporator instead of forming scale therein.

11. Claim 1, wherein a nucleant comprising a finely divided material, selected preferably from among compounds of alumina, ferric hydroxide, calcium carbonate and magnesium hydroxide, is combined with the vaporizing saline water, whereby the thermal decomposition is accelerated.

12. Claim 1, wherein precipitate of alkaline scale compound is recirculated to the vaporizing saline water as nucleant, whereby the thermal decomposition is accelerated.

13. Claim 1, in which the saline water is deaerated before evolved carbon dioxide is recycled to it, and is deoxygenated.

14. A process for converting saline water, characterized by the presence in solution of alkaline scale-forming compounds consisting chiefly of calcium and magnesium bicarbonates, to fresh water and brine, which comprises heating saline water; passing the heated saline water at an elevated temperature to a flash vaporization chamber and flash vaporizing the saline water, forming flashed vapor sufficient to result in a low partial pressure of carbon dioxide in the chamber; through the elevated temperature and low partial pressure of carbon dioxide, thermally decomposing alkaline scale-forming compounds, forming a precipitate of alkaline scale compound while liberating carbon dioxide from the flashed saline water; discharging uncondensed, flashed vapor and carbon dioxide from the flash vaporization chamber; separating to the extent required precipitate of alkaline scale compound from the flashed saline water and forming post-vaporized saline water; and passing post-vaporized saline water to an evaporator, forming fresh water and brine.

References Cited

UNITED STATES PATENTS

| | | | |
|---|---|---|---|
| 3,119,752 | 1/1964 | Checkovich | 203—11 |
| 3,026,261 | 3/1962 | Mayfield, et al. | 203—7 |
| 3,607,666 | 9/1971 | Roller | 203—7 |
| 3,218,241 | 11/1965 | Checkovich | 203—11 |
| 2,979,442 | 4/1961 | Badger | 203—7 |
| 3,420,775 | 1/1969 | Cadwallader | 203—7 |

FOREIGN PATENTS

| | | | |
|---|---|---|---|
| 208,503 | 5/1924 | Great Britain | 203—7 |

OTHER REFERENCES

E. A. Cadwallader: "Carbon Dioxide, The Key to Economical Desalination," Industrial and Engr. Chem., Vol. 59, No. 10, pp. 43–7, October 1967.

NORMAN YUDKOFF, Primary Examiner

C. P. RIBANDO, Assistant Examiner

U.S. Cl. X.R.

203—11; 202—174